Figure 1:
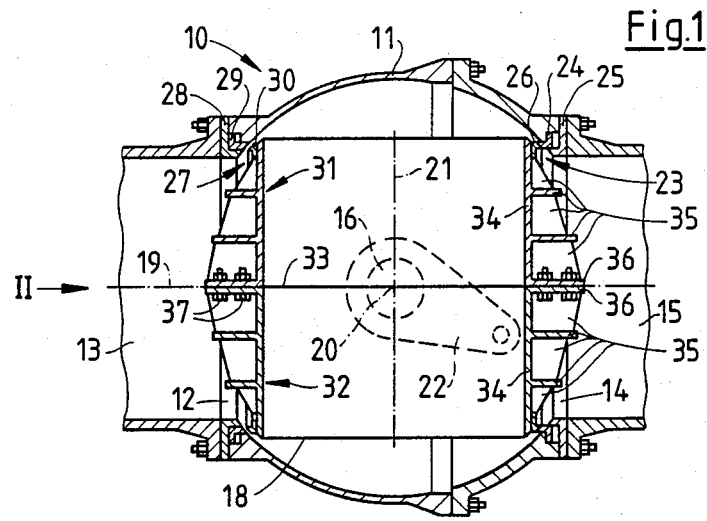

United States Patent [19]

Staude

[11] Patent Number: 4,776,364
[45] Date of Patent: Oct. 11, 1988

[54] BALL SLIDE, SPECIFICALLY FOR PRESSURE LINES IN HYDROPOWER PLANT

[75] Inventor: Guenter Staude, Heidenheim, Fed. Rep. of Germany

[73] Assignee: J.M. Voith GmbH, Heidenheim, Fed. Rep. of Germany

[21] Appl. No.: 114,412

[22] Filed: Oct. 28, 1987

[30] Foreign Application Priority Data

Nov. 7, 1986 [DE] Fed. Rep. of Germany ....... 3638069

[51] Int. Cl.⁴ .............................................. F16K 3/08
[52] U.S. Cl. .................................. 137/315; 251/304
[58] Field of Search ............... 251/172, 304, 309, 315; 137/315

[56] References Cited

U.S. PATENT DOCUMENTS

| | | | |
|---|---|---|---|
| 2,674,987 | 4/1954 | Camfield | 251/309 X |
| 3,064,937 | 11/1962 | Pryor | 251/315 X |
| 3,323,537 | 6/1967 | Shafer | 251/315 X |
| 4,150,810 | 4/1979 | Laignel et al. | 251/315 X |

Primary Examiner—A. Michael Chambers
Assistant Examiner—J. Baja Fox
Attorney, Agent, or Firm—Albert L. Jeffers

[57] ABSTRACT

The tubular rotary body of a ball slide consists of components which transverse to its longitudinal axis bear on one another and are detachably connected with one another. The rotary body is preferably split in two in its axis of rotation plane. Reinforcement ribs screwed together in the joining plane and pivot pin flanges connected positively and nonpositively with the rotary body components ensure the coordination of said components. Splitting the rotary body circumvents hauling difficulties, without weakening the load capacity of the rotary slide.

6 Claims, 1 Drawing Sheet

BALL SLIDE, SPECIFICALLY FOR PRESSURE LINES IN HYDROPOWER PLANT

The invention relates to a ball slide (ball valve), especially for pressure lines in hydropower plants, of the type having a housing featuring opposite connecting sockets, a tubular rotary body mounted in the housing through pivot pins and extending in its open position on both sides of its axis of rotation toward the connecting sockets.

A previously known ball slide is shown in German patent disclosure No. 1,500,243. The rotary body taught there consists of a tubular internal component, reinforcement ribbing attached to it, and flanges that support packing rings, plates and pivot pins. The components of the rotary slide are interconnected by welding. This is to result in a rotary body which is relatively lightweight, despite its size.

But it is not the weight of large ball slides that poses difficulties in the manufacture and assembly. Rather, it is the size of the components of a ball slide, specifically of the rotary body, which makes the hauling between the manufacturing facility and the installation site difficult. The rotary body of a ball slide with an inside clearance of, e.g., 3.5 m, has as the smallest major dimension a longitudinal expanse, in flow direction, of nearly 4 m, to which must be added yet the bed height of the truck. But a solution of the hauling problem, by fabricating large ball slides at the installation site, is ruled out due to the very high expense involved in welding, annealing, and machining of the slide components. Besides, a ball slide composed of castings cannot be fabricated at the installation site anyhow.

The problem underlying the invention is to provide a rotary body for a ball slide composed of individually haulable parts which can be assembled at the installation site without expensive retouching. Also, the rotary body should be able to withstand high stress.

This problem is solved through the present invention.

The solution is advantageous inasmuch as a rotary body so divided will not present any difficulties in hauling its components with their longitudinal axis arranged vertically. In the closing position of the rotary body, in which it is highly stressed by the operating water, the joints between the components connected with each other extend parallel to the working direction of the operating water pressure, so that the stress (essentially from shear forces) will be safely absorbed there due to an appropriate design of the connections between components.

Additional favorable advancements of further aspects of the invention are described briefly.

In one aspect, the longitudinal expanse of the rotary body is halved, resulting in an especially favorable arrangement in terms of load, since the forces stemming from the operating water pressure act in the closed position of the rotary body on the pivot pins in the joining plane, while the bending moments in the rotary body with a bending axis extending perpendicular to the joining plane act on rotary body components which on both sides of the joint are symmetrically stressed by the operating water, so that components arranged at a right angle to the joint, such as screws etc., and serving to connect the components will be subjected to only slight shear forces.

In another aspect, the ball slide includes a pivot pin flanged to the rotary body. A positional coordination of high accuracy is achieved with a connection between the rotary body components and the pivot pin that absorbs high transverse forces.

In yet another aspect, reinforcement ribbing which at least partly envelopes the rotary body provides for a connection that is well accessible and increases the design strength of the rotary body.

An embodiment of the invention will be more fully explained hereafter with the aid of the drawing.

Figure 2:
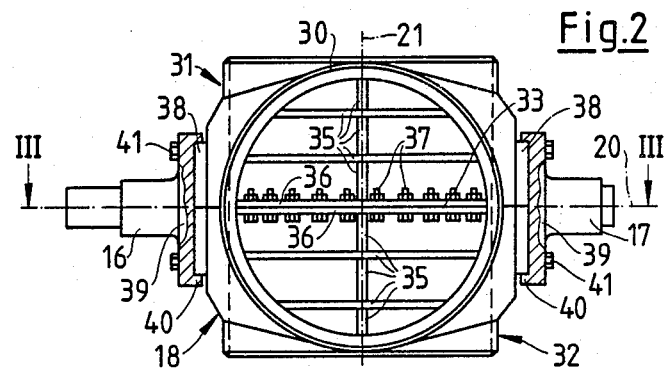
Figure 3:
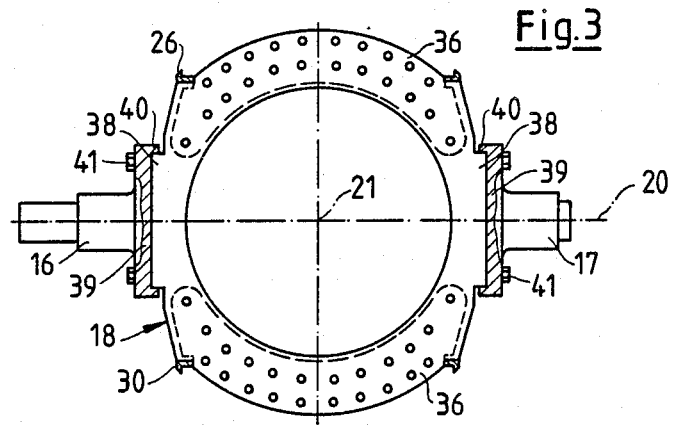

FIG. 1, shows a longitudinal section through a ball slide with a split rotary body in closed position;

FIG. 2, a view (in the direction of arrow II in FIG. 1) of the upstream end of the rotary body;

FIG. 3, a section of the rotary body along the line III—III, in FIG. 2, that forms at the same time the joint between the two rotary body components.

A ball slide marked 10 has an essentially two-part housing 11 with its upstream connecting sleeve 12 hooked to a pressure line 13 and with its downstream connecting sleeve 14 hooked to the intake socket 15 of an otherwise not illustrated hydroturbine (FIG. 1). A rotary body 18 mounted with the aid of two pivot pins 16, 17 is arranged in the housing 11, the longitudinal axis 19 of the housing 11 being intersected at a right angle by the axis of rotation 20 of the rotary body 18. In turn, both axes 19 and 20 intersect in the closed position of the rotary body 18 illustrated in FIG. 1 the longitudinal axis 21 of the latter at a right angle. The rotary body can be turned 90° counterclockwise by a (not illustrated) hydraulically operated thrust motor (servomotor), into its open position in which the rotary body 18 extends on both sides of its axis of rotation plane, which extends at a right angle to the longitudinal axis, up to the connecting sleeve 12 or 14, respectively. For application of the thrust motor, the extended pivot pin 16 passes through the housing 11 is provided with a single-arm operating lever 22.

On the far side from the water, the ball slide 10 is provided with a main seal 23 comprising a hydraulically axially movable packing ring 24 which with an intermediate ring 25 runs in the housing 11. In the working position of the main seal 23, the packing ring 24 bears on a ring seat 26 of the rotary body 18. On the upstream side, the ball slide is equipped with an inspection seal 27 which as well features a packing ring 29 running with an intermediate ring 28 in the housing 11 and features on the rotary body 18 a ring seat 30 which is coordinated with the packing ring 29.

The tubular rotary body 18 includes two components 31 and 32 which bear on one another (FIGS. 1 and 2) along a joint 33 extending transverse to its longitudinal axis 21. In the closed position of the rotary body 18 as illustrated in FIG. 1, the longitudinal axis 19 of the ball slide 10 lies in the joining plane 33. Additionally, the axis of rotation 20 extends along the joining plane 33.

Arranged axially alike relative to one another, the rotary body components 31 and 32 each have an internal tube 34 of same diameter and same axial length. In the area circumscribed by the ring seats 26 and 30, the rotary body components 31 and 32 are provided each with several reinforcement ribs 35, some of which extend parallel with the longitudinal axis 21 of the rotary body. Each of the rotary bodies 31 and 32 features a reinforcement rib 36 designed as a flange and bordering directly on the joining plane 33, along which rib 36 the two rotary body components 31 and 32 bear on one another. Screws 37 extending through the two reinforcement ribs 36 of the two rotary body components 31 and 32 serve the nonpositive connection of both rotary body components, while not illustrated measures additionally ensure the positive connection between both rotary body components (FIGS. 2 and 3).

In the area of the axis of rotation 20, the rotary body 18 is on opposite sides provided with a reinforced wall section extending in a cylindrical projection 38 which is arranged symmetrically relative to the joining plane 33. Axially alike with the axis of rotation 20 of the rotary body 18, the cylindrical projection serves as the mounting for the respective pivot pin 16 or 17. The latter features a flange 39 bearing endwise on the cylindrical projection 38 and nesting in form-fitting fashion peripherally over the projection with a collar 40 extending axially. The nonpositive connection of the respective pivot pin flange 39, on the cylindrical projection 38, is assumed by screws 41. Accomplished thereby is a positive and nonpositive connection of the two components 31 and 32 of the rotary body 18, also beside the area of the screw-connected reinforcement ribs 36, that withstands high stress.

What is claimed is:

1. In combination with a ball slide for pressure lines in hydropower plants, including a housing having opposed connecting sockets, a tubular rotary body having a longitudinal axis and mounted in the housing by pivot pins for rotation relative to the housing about an axis of rotation passing through the pivot pins, said ball slide having an open position in which the tubular rotary body, in the direction of the longitudinal axis thereof, extends on both sides of a plane which includes the axis of rotation and which is perpendicular to the longitudinal axis toward the respective opposed connecting sockets, the improvement comprising: said tubular rotary body being composed of a plurality of components detachably connected to one another at joints which extend at least approximately perpendicular to said longitudinal axis.

2. The improved ball slide of claim 1, in which said tubular rotary body is split in two along said axis of rotation, perpendicular to said longitudinal axis.

3. The improved ball slide of claim 2, in which said pivot pins are flanged to said tubular rotary body, said tubular rotary body including in the area of each pivot pin a cylindrical projection coaxial with said axis of rotation, each of said pivot pins including a flange having an axially extending collar portion, which flange is mounted endwise to the respective cylindrical projection with the collar portion nesting peripherally over the cylindrical projection in form-fitting fashion.

4. The improved ball slide of claim 3, in which said tubular rotary body includes reinforcement ribs at least partially enveloping said tubular rotary body, the reinforcement ribs bearing upon one another in the area of the joints and being conjoined by threaded connections.

5. The improved ball slide of claim 2, in which said tubular rotary body includes reinforcement ribs at least partially enveloping said tubular rotary body, the reinforcement ribs bearing upon one another in the area of the joints and being conjoined by threaded connections.

6. The improved ball slide of claim 1, in which said tubular rotary body includes reinforcement ribs at least partially enveloping said tubular rotary body, the reinforcement ribs bearing upon one another in the area of the joints and being conjoined by threaded connections.

* * * * *